(12) United States Patent
Yokose et al.

(10) Patent No.: US 6,574,008 B1
(45) Date of Patent: Jun. 3, 2003

(54) IMAGE PROCESSING DEVICE

(75) Inventors: Taro Yokose, Nakai-machi (JP); Ikken So, Nakai-machi (JP); Mitsuyuki Tamatani, Nakai-machi (JP); Yasuharu Sakurai, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/514,150

(22) Filed: Feb. 28, 2000

(30) Foreign Application Priority Data

Mar. 4, 1999  (JP) .......................................... 11-057350

(51) Int. Cl.[7] .............................................. G06F 15/00
(52) U.S. Cl. .................. 358/1.17; 358/1.16; 358/261.2; 358/450; 358/540
(58) Field of Search .......................... 358/1.1, 1.2, 1.5, 358/1.9, 1.11, 1.12, 1.13, 1.14, 1.15, 1.16, 1.17, 540, 450, 261.2, 430

(56) References Cited

U.S. PATENT DOCUMENTS 6,388,669 B2 * 5/2002 Minami et al. ............. 345/474
6,392,659 B1 * 5/2002 Ohki et al. ................. 345/630

FOREIGN PATENT DOCUMENTS

| JP | 5-31974 | 2/1993 |
| JP | 5-37789 | 2/1993 |

* cited by examiner

*Primary Examiner*—Mark Wallerson
(74) *Attorney, Agent, or Firm*—Morgan, Lewis & Bockius LLP

(57) ABSTRACT

An image processing device that executes high speed overwriting of an input image with one or more partial images. A processing prediction unit judges whether overwriting is completed on all the partial images held in a small area buffer. If overwriting is completed, the overwritten partial image is compressed by an encoding unit, and the coded image is stored in a compact page memory. If overwriting is not completed, the uncompressed partial image is stored in the compact page memory. The uncompressed partial image is read from the compact page memory and is fed back to the overwriting unit through an output switch unit. The coded image stored in the compact page memory is sent to a decoding unit through the output switch unit, and is decoded to be outputted as an output image.

22 Claims, 18 Drawing Sheets

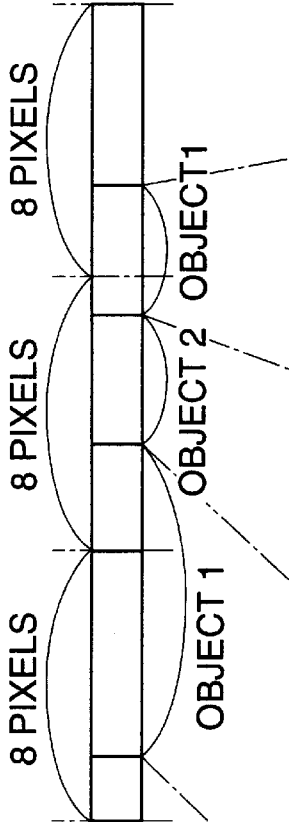
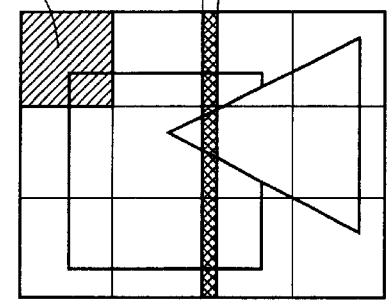
*FIG.4A*
*FIG.4B*
*FIG.4C*

| SMALL AREA | FINAL OVERWRITING IMAGE |
|---|---|
| (0,0) | #4 |
| (BW,0) | #10 |
| (2BW,0) | #10 |
| ... | ... |
| (W-BW,H-BH) | #1 |

INPUT IMAGE DATA 110

FIG.10A
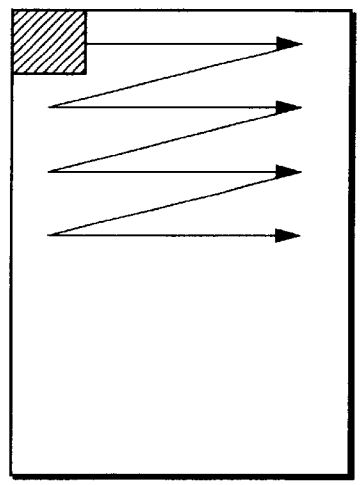
BLOCK
FIG.10B
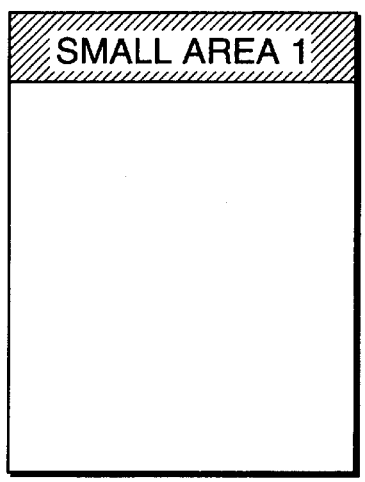
SMALL AREA 1
FIG.10C
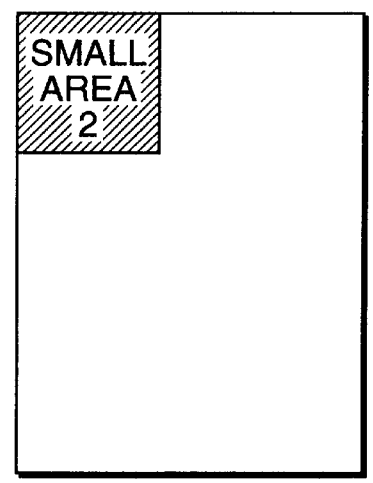
SMALL AREA 2
FIG.10D
| BLOCK LINE | OFFSET FROM LEADING BLOCK | LENGTH OF CODE |
|---|---|---|
| 1 | | |
| 2 | | |
| …… | | |
| N | | |

210

211   210

FIG.18A
INPUT IMAGE 1
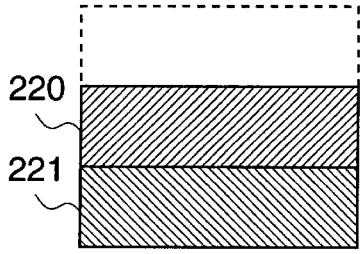
FIG.18B
INPUT IMAGE 2
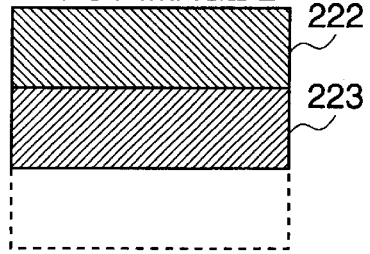
FIG.18C
| |
|---|
| 220 SKIP |
| 221 SKIP |
| 222 INPUT |
| 223 SKIP |
| 222 CODE, STORE |
| 220 INPUT |
| 221 SKIP |
| 222 SKIP |
| 220 223 OVERWRITE |
| 220+223 CODE, STORE |
| 220 SKIP |
| 221 INPUT |
| 222 SKIP |
| 223 SKIP |
| 221 CODE, STORE |
| 222 DECODE, OUTPUT |
| 222+223 DECODE, OUTPUT |
| 221 DECODE, OUTPUT |
OPERATION SEQUENCE OF FIRST CONVENTIONAL EXAMPLE
FIG.18D
| |
|---|
| 220 CODE, STORE |
| 221 CODE, STORE |
| 222 CODE, STORE |
| 220 DECODE |
| 220 223 OVERWRITE |
| 222 CODE, STORE |
| 220+223 CODE, STORE |
| 221 CODE, STORE |
OPERATION SEQUENCE OF SECOND CONVENTIONAL EXAMPLE

IMAGE PROCESSING DEVICE

BACKGROUND OF THE INVENTION

1. Field of the Invention

The present invention relates to a technique that processes image data, specifically to a technique that implements the overwriting of images at a low cost at high speed.

2. Description of the Related Art

First of all, the overwriting of images that the present invention aims at will be defined. That is, the overwriting of images here signifies processing to overwrite an image with another unit of image. For example, the overwriting here includes a superscription by an opaque ink, which is processed by the PS (PostScript, "Postscript reference manual $2^{nd}$ version"(Adobe Systems, ASCII), etc., PostScript is the trademark of US Adobe Systems Corp.) being a type of the PDL (Page Description Language). The unit image as defined above may be a sheet of raster as defined in the PDL, or a piece of plotting object.

The overwriting on the spatial coordinates of images cannot be carried out by one directional processing. The reason is as follows. The general image processing can be carried out in one direction, for example, from the upper left to the lower right, which includes, for example, expansion, contraction, and spatial filtering, etc. "handbook image analysis" (Takagi, Shimoda, Tokyo Univ. Publishing association). In contrast to this, in the overwriting, the image with which the overwriting is executed can be inputted at random to the spatial coordinates of the output image. Therefore, as far as it is processed in order of input, the image cannot be processed, on the output image, in order of the spatial coordinates. FIG. 13 illustrates the overwriting. In the drawing, 210, 211 show plotting objects. The drawing illustrates a processing to overwrite the object 210 with the object 211. It is clear from the drawing that the random scan on the output image and page memories for the overwriting are needed.

In this manner, the overwriting proceeds while adding a process to data on the halfway of a certain process. When this is viewed as a data flow, it is found that the so-called feedback loop is produced. In general, a feedback loop produces an overhead to the processing time to make the control complicated, and the loop should be shorter.

While the page memory is necessary, the memory size should be small from the view point of cost. Accompanied with a higher quality of images that the image processing devices present in recent years, the resolution of the images is enhanced. Although the unit price of memory is significantly reduced, the reduction of quantity in using memories is still an important problem. Now, the conventional technique to reduce the page memory will be explained.

First Convention Example

As the first conventional example, the Japanese Published Unexamined Patent Application No. Hei 5-31974 will be explained. The basic theory of the first conventional example is to apply the image compression coding while storing the image on which the overwriting has been completed in the page memory, and thereby reduce the necessary quantity of memory.

FIG. 14 illustrates a block diagram of the first conventional example. However, the terms are changed to match the explanation of this invention, without damaging the gist of the disclosed contents of the Published Application, and unnecessary parts for the explanation are omitted. In the drawing, 10 denotes an image input unit, 20 an overwriting unit, 30 a small area buffer, 40 an output switch unit, 50 an encoding unit, 60 a compact page memory, 70 a decoding unit, 80 an image output unit, 110 input image data, 120, 130 processed image data, 140 stored image data, 150 output image data, 160, 170 coded image data, and 180 decoded image data.

Each of the units in FIG. 14 will be explained. The image input unit 10 enters image data from an external device. The overwriting unit 20 overwrites the stored image data 140 with the input image data 110, using a predetermined small area as a processing unit, to send out the processed image data 120 to the small area buffer 30. The small area buffer 30 stores the processed image data 120 to send them out as the processed image data 130 to the output switch unit 40. If the overwriting of the processed image data 130 has been completed, the output switch unit 40 sends them out to the encoding unit 50 as the output image data 150; and if not, the output switch unit 40 sends them out to the overwriting unit 20 as the stored image data 140. The encoding unit 50 applies a specific compression coding to the output image data 150 to send out the result to the compact page memory 60 as the coded image data 160. The compact page memory 60 stores the coded image data 160, and when the coded image data corresponding to all the small areas are complete, sends them out to the decoding unit 70 as the coded image data 170. The decoding unit 70 performs the decoding processing as an inverse transformation of the compression coding by the encoding unit 50, and sends out the result to the image output unit 80 as the decoded image data 180. The image output unit 80 delivers the decoded image data 180 to an external device.

Based on the above configuration, the first conventional example will be explained as to the image processing procedure. FIG. 15 illustrates a flowchart explaining the operation of the first conventional example.

First, the terms will be defined. In the first conventional example, the image is divided into partial images. The divided partial images are called small areas. And, the image now being processed will be called an image in attention, and similarly the small area now being processed will be called a small area in attention.

Referring to FIG. 15, the operation of the first conventional example will now be explained. At S10, the image input unit 10 inputs the input image data 110. At S20, the input image data 110 are individually processed as a small area unit, and if the part now being inputted is correspondent to the small area in attention, the step advances to step S30; and if not, it advances to S50. At S30, the small area in attention stored in the small area buffer 30 is read as the stored image data 140 through the output switch unit 40. At S40, the overwriting unit 20 executes the overwriting of the input image data 110 on the stored image data 140. At S50, since the input image data 110 are not correspondent to the small area in attention, the small area is skipped. At S60, if the processing of all the small areas in attention is completed, the step advances to S70; and if not, it returns to S20. At S70, if the processing of all the input images is completed, the step advances to S80; and if not, it advances to S90. At S80, the encoding unit 50 executes the encoding to the output image data 150 on which the overwriting has been finished, and stores the result in the compact page memory 60. At S90, the image in attention is shifted to the next image. At S100, if the overwriting on all the small areas is completed, the step advances to S110; and if not, it advances to S120. At S110, the decoding unit 70 executes the decoding processing to the coded image data 170, and outputs the result to the image output unit 80. At S120, the small area in attention is shifted to the next small area, and the image in attention is shifted to the leading image of the input image data 110.

In the foregoing operation, the encoding unit 50 and the decoding unit 70 execute the image compression coding such that the data size of the coded image data 160 becomes smaller than that of the processed image data 130. The first conventional example presents an example of the compression using the DCT (Discrete Cosine Transform).

According to the first conventional example, since the image data on which the overwriting has been completed are encoded to be stored, the quantity of memory equivalent to the code quantity for one sheet of image is needed to be provided, and the memory quantity can be reduced. Thus, the memory intended to store one sheet of image by means of the image compression is called a compact page memory.

The first conventional example assumes a configuration to execute the encoding processing in the pixel order of the output image. Accordingly, it is required to repeatedly input the input image to be paired with the output image, which invites an increase of processing time.

Second Conventional Example

As the second conventional example to solve this problem, the Japanese Published Unexamined Patent Application No. Hei 5-37789 will be explained. The basic theory of the second conventional example is to execute the image compression coding of images on the halfway of the overwriting, store the result in the page memory, and finish up the image input at one time while reducing the necessary memory quantity.

FIG. 16 illustrates a block diagram of the second conventional example. In the drawing, the same parts as in FIG. 14 are given the same symbols, and the explanation will be omitted. 141 denotes stored image data, 181 decoded image data.

Based on the above configuration, the second conventional example will be explained as to the image processing procedure. FIG. 17 illustrates a flowchart explaining the operation of the second conventional example. In the drawing, the same parts as in FIG. 15 are given the same symbols, and the explanation will be omitted.

Referring to FIG. 17, the operation of the second conventional example will now be explained. At S31, the coded image data 170 of the small area in attention stored in the compact page memory 60 are read out, the encoding unit 70 executes the encoding processing to the coded image data 170 read out, and the resultant data are inputted as the stored image data 141 to the overwriting unit 20 through the output switch unit 40. At S81, regardless of whether the overwriting of the small area in attention is completed or not, the encoding unit 50 executes the encoding processing to the processed image data 130.

According to the second conventional example, the memory quantity can be reduced by the compact page memory in the same manner as the first conventional example. And, since the small area images on the halfway of the overwriting are also stored in the compact page memory, repeated inputs of one and the same image become unnecessary.

On the other hand, since all the small area images including those under process are made to be encoded, the load to the encoding processing becomes heavy, thus producing an overhead to the processing time. And, in case of employing the irreversible encoding as the encoding system, since the encoding is repeated to the same image, errors called as the generation noise are accumulated, which invites deterioration of image quality.

The problems of the conventional examples will be summarized. FIG. 18 illustrates examples of the overwriting sequences by the conventional examples. Here, the sequence to overwrite the input image 1 with the input image 2 is conceived.

According to the first example, in order to process a part corresponding to a small area 222, small areas 220, 221, 223 are skipped. Since the other parts also produce the same skips, the overhead relating to the image input is understood as significant. According to the second conventional example on the other hand, before overwriting of the small area 223 on the small area 220, the small area 220 has to be decoded. This corresponds to the feedback of the stored image data 141, but the inclusion of the decoding operation prolongs this feedback loop, and also invites an increase of processing time. Further, as mentioned above, the deterioration of image quality will be a problem in the irreversible encoding.

SUMMARY OF THE INVENTION

The present invention has been made in view of the above circumstances, and provides an image processing device that implements the overwriting of an image in a low cost at high speed.

In accordance with one aspect of the invention, the image processing device that executes overwriting on an image once inputted and to be fed back and another image newly inputted is provided with an image input part that inputs the image, an overwriting part that executes the overwriting of the input image and the image to be fed back with units of partial images, a partial image storage part that holds a partial image outputted from the overwriting part as an overwriting result, a processing prediction part that executes a processing prediction for the partial image of the partial image storage part, a determination part that determines whether the encoding part executes the image compression coding of the partial image or not, on the basis of the processing prediction by the processing prediction part, an encoding part that executes image compression coding of the image, a data storage part that stores a partial image encoded and a partial image not encoded, a decoding part that performs decoding processing being reverse processing of the coding processing executed by the encoding part, an output switch part that switches, if an output from the data storage part is the partial image not encoded, the output to the overwriting part, and switches the output to the decoding part, if it is the partial image encoded, and an image output part that outputs an image acquired by the decoding part. In the device, the processing prediction executes a prediction as to whether or not the overwriting is to be executed thereafter, and the determination part sends only the partial image on which the overwriting has been finished to the encoding part.

In this configuration, a partial image predicted as unnecessary for the overwriting is stored as a code, and a partial image predicted as necessary for the overwriting is stored as it is. Therefore, when a partial image for the overwriting is fed back, the partial image can be outputted as it is without executing the decoding, which enables high speed processing. Moreover, a partial image having completed the processing is compressed, which leads to an effective use of the memory resource.

In accordance with another aspect of the invention, the image processing device that executes overwriting of an image once inputted and fed back and another image newly inputted is provided with an image input part that inputs the image, an overwriting part that executes the overwriting of the input image and the image fed back with units of partial images, a partial image storage part that holds a partial image outputted from the overwriting part as an overwriting result, a processing prediction part that executes a processing prediction for the partial image of the partial image storage part, a determination part that determines whether the encoding part executes the image compression coding of the partial image or not, on the basis of the processing prediction by the processing prediction part, an encoding part that executes image compression coding of the image, a data storage part that stores a partial image encoded and a partial image not encoded, a code conversion part that executes a code conversion on a code outputted from the data storage part to reduce a code amount; an output switch part that switches, if an output from the data storage part is the partial image not encoded, the output to the overwriting part, and switches the output to the code conversion part, if it is the code, and a code output part that outputs a code acquired by the code conversion part. In the device, the processing prediction executes a prediction as to whether or not the overwriting is to be executed thereafter, and the determination part sends only the partial image on which the overwriting has been finished to the code conversion part.

Also in this configuration, the overwriting can be executed at high speed, and the memory resource can be used effectively.

In accordance with another aspect of the invention, the image processing device that executes overwriting of an image once inputted and to be fed back and another image newly inputted is provided with an image input part that inputs the image, an overwriting part that executes the overwriting of the input image and the image to be fed back with a unit of a partial image, a partial image storage part that holds a partial image outputted from the overwriting part as an overwriting result, a first data storage part that stores a partial image outputted from the partial image storage part, and feeds back the partial image stored therein to the overwriting part, an encoding part that executes image compression coding of the partial image outputted from the partial image storage part, a second data storage part that stores a code outputted from the encoding part, a decoding part that applies to a code outputted from the second storage data part decoding processing being reverse processing of the coding processing executed by the encoding part, and an image output part that outputs an image acquired by the decoding part. In the device, the partial image is stored in the first data storage part and the second data storage part, respectively, in a form of the image and the code.

Also in this configuration, the overwriting can be executed at high speed, and the memory resource can be used effectively.

In accordance with another aspect of the invention, the image processing device that executes overwriting of an image once inputted and to be fed back and another image newly inputted is provided with an image input part that inputs the image, an overwriting part that executes the overwriting of the input image and the image fed back with a unit of a partial image, a partial image storage part that holds a partial image outputted from the overwriting part as an overwriting result, a first data storage part that stores a partial image outputted from the partial image storage part, and feeds back the partial image stored therein to the overwriting part, an encoding part that executes image compression coding of the partial image outputted from the partial image storage part, a second data storage part that stores a code outputted from the encoding part, a code conversion part that executes a code conversion on a code outputted from the second data storage part to reduce a code amount, and a code output part that outputs a code acquired by the code conversion part. In the device, the partial image is stored in the first data storage part and the second data storage part, respectively, in a form of the image and the code.

Also in this configuration, the overwriting can be executed at high speed, and the memory resource can be used effectively.

Further, the invention can be accomplished also in a method and a software product.

BRIEF DESCRIPTION OF THE DRAWINGS

Preferred embodiments of the present invention will be described in detail based on the followings, wherein:

FIGS. 4A–4C are diagrams explaining the processing prediction in the first embodiment of the image processing device of the invention;

FIGS. 10A–10D are diagrams explaining the scan order in the second embodiment of the image processing device of the invention;

FIGS. 18A–18D are diagrams explaining the processing sequence of the first and second conventional examples.

DETAILED DESCRIPTION OF PREFERRED EMBODIMENTS

Before the concrete description of the invention, the basic theory of the invention will be discussed.

First, the conventional examples will be examined. The cause that induces the problems put forward in the explanation of the conventional examples comes from the treatment of the feedback loop in the overwriting.

In the first conventional example, since the encoding and the decoding processing for achieving the compact page memory are removed from the feedback loop, a high speed processing can be accomplished with regard to only the small area in attention. However, in order to implement this configuration, a large feedback loop had to be incorporated as the processing sequence. This signifies the loop shown in the flowchart, accompanied with the transition of the small area in attention. This involves repeated inputs of the same image, which inversely effects an increase of the processing time.

In the second conventional example, to avoid the feedback loop of the processing sequence, the storage into the compact page memory is included as a data flow in the overwriting in small area units. As the result, the processing sequence is simplified, but the encoding and decoding processing are incorporated, which are originally unnecessary for the feedback loop, and the loop is elongated to increase the processing time accordingly.

Thus, the invention contemplates that the data requiring the feedback are not encoded, and only the data permissible of being outputted as they remain are encoded. Accordingly, the invention analyzes an image by each small area, and predicts a processing path hereafter. As the result, the data requiring the feedback, namely, the small areas in which the overwriting has not been finished are not encoded; and the data not requiring the feedback, namely, the small areas in which the overwriting has been finished are encoded and stored. Thus, the invention achieves the overwriting at a low cost at high speed.

First Embodiment

Figure 1:
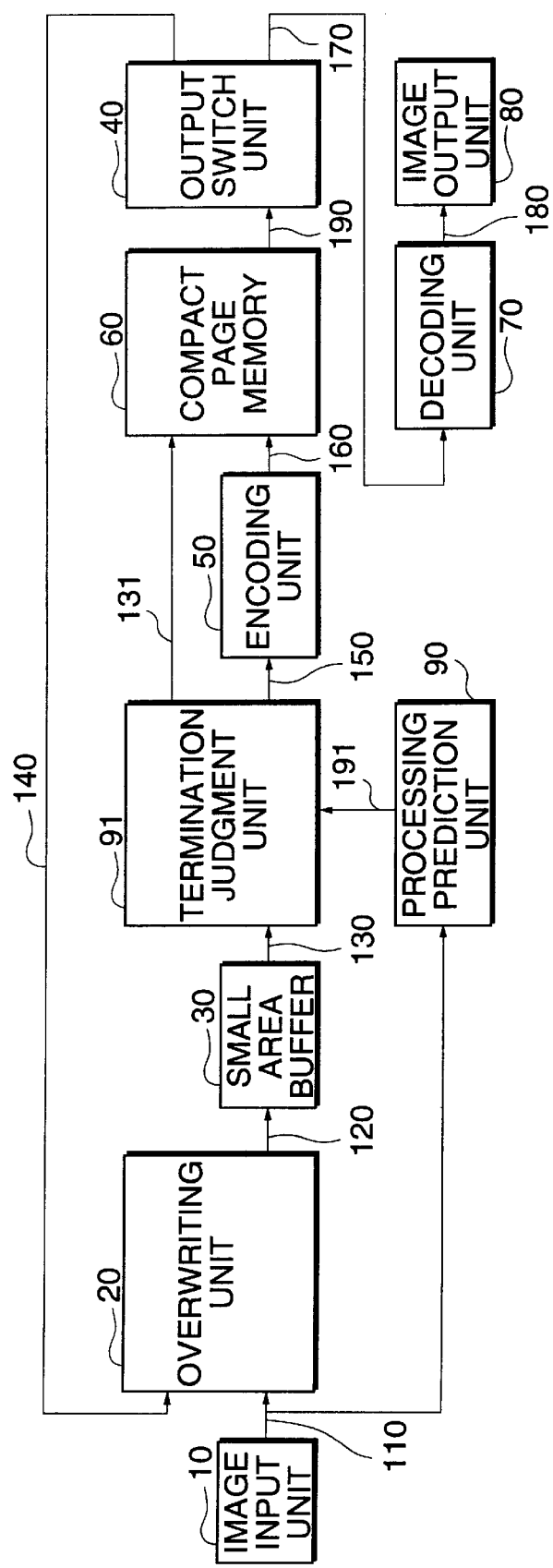
FIG. 1 is a block diagram illustrating the first embodiment of an image processing device of the present invention.
Figure 14:
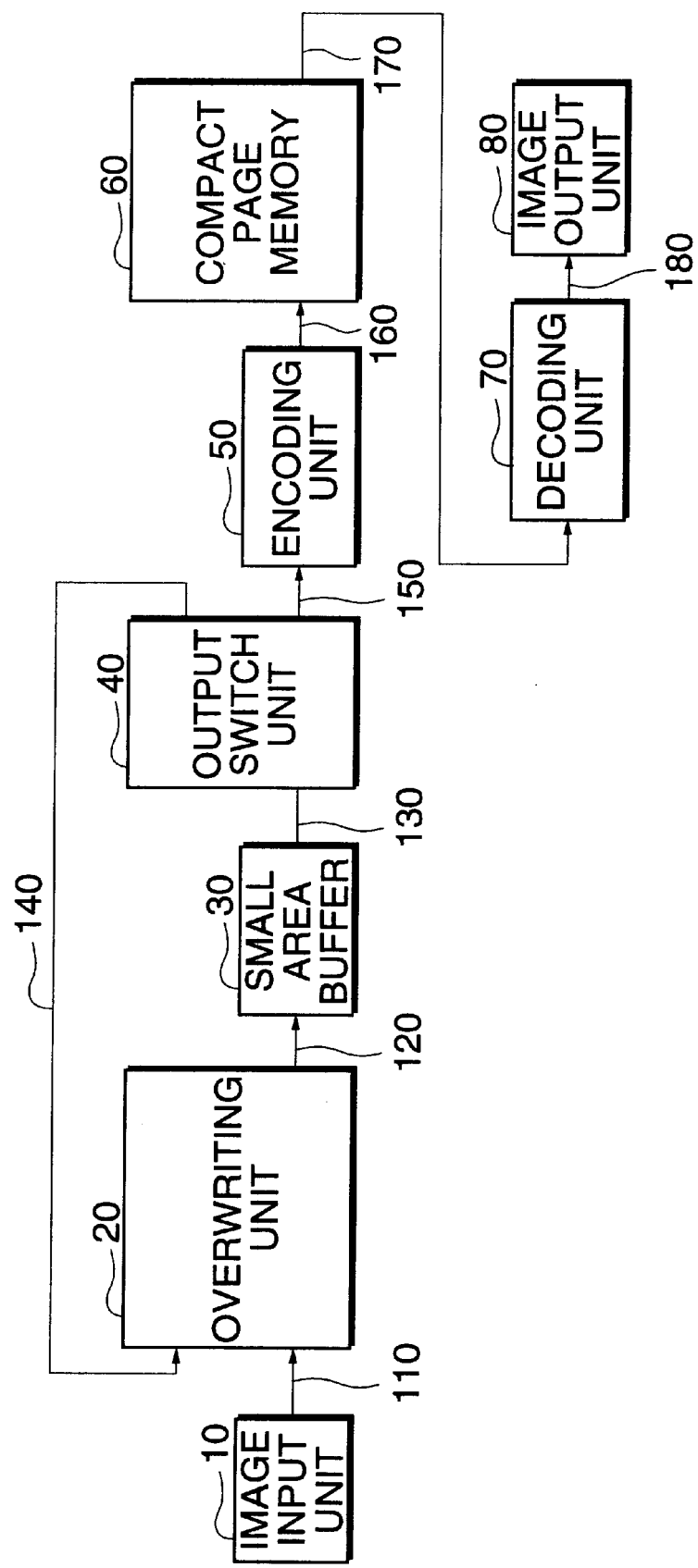
FIG. 14 is a block diagram illustrating the image processing device of the first conventional example.
Figure 16:
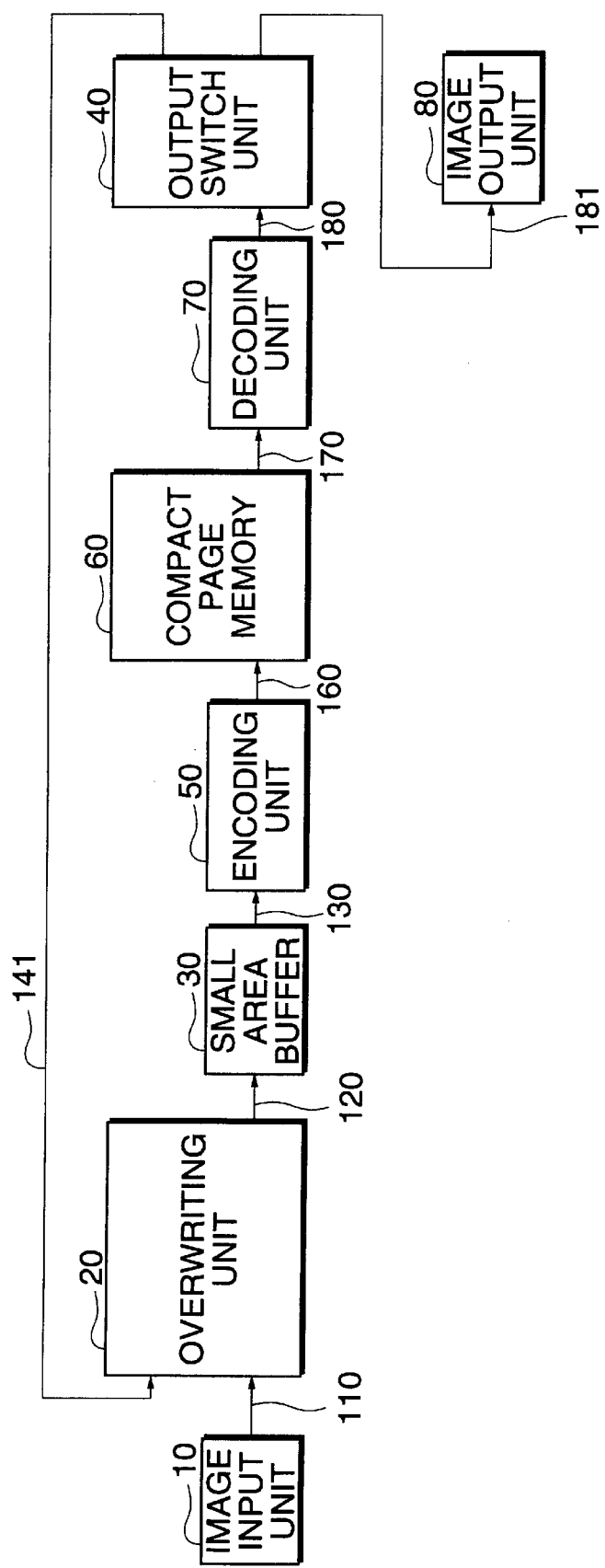
FIG. 16 is a block diagram illustrating the image processing device of the second conventional example.

The first embodiment of the invention will be discussed. FIG. 1 illustrates a block diagram of the first embodiment of the invention. In the drawing, the same parts as those in FIG. 14 and FIG. 16 are given the same symbols, and the explanation will be omitted. In FIG. 1, 90 denotes a processing prediction unit, 91 a termination judgment unit, 131 processed image data, 190 stored image data, and 191 processing prediction data.

Next, each of the units in FIG. 1 will be explained. The processing prediction unit 90 predicts, as to the overwriting of a small area in attention, whether it is the final overwriting or not. On the basis of the prediction result by the processing prediction unit 90, the termination judgment unit 91 sends out the data on which the overwriting has been finished to the encoding unit 50 as the output image data 150, and sends out the data on which it has not been finished to the compact memory 60 as the processed image data 131

Figure 2:
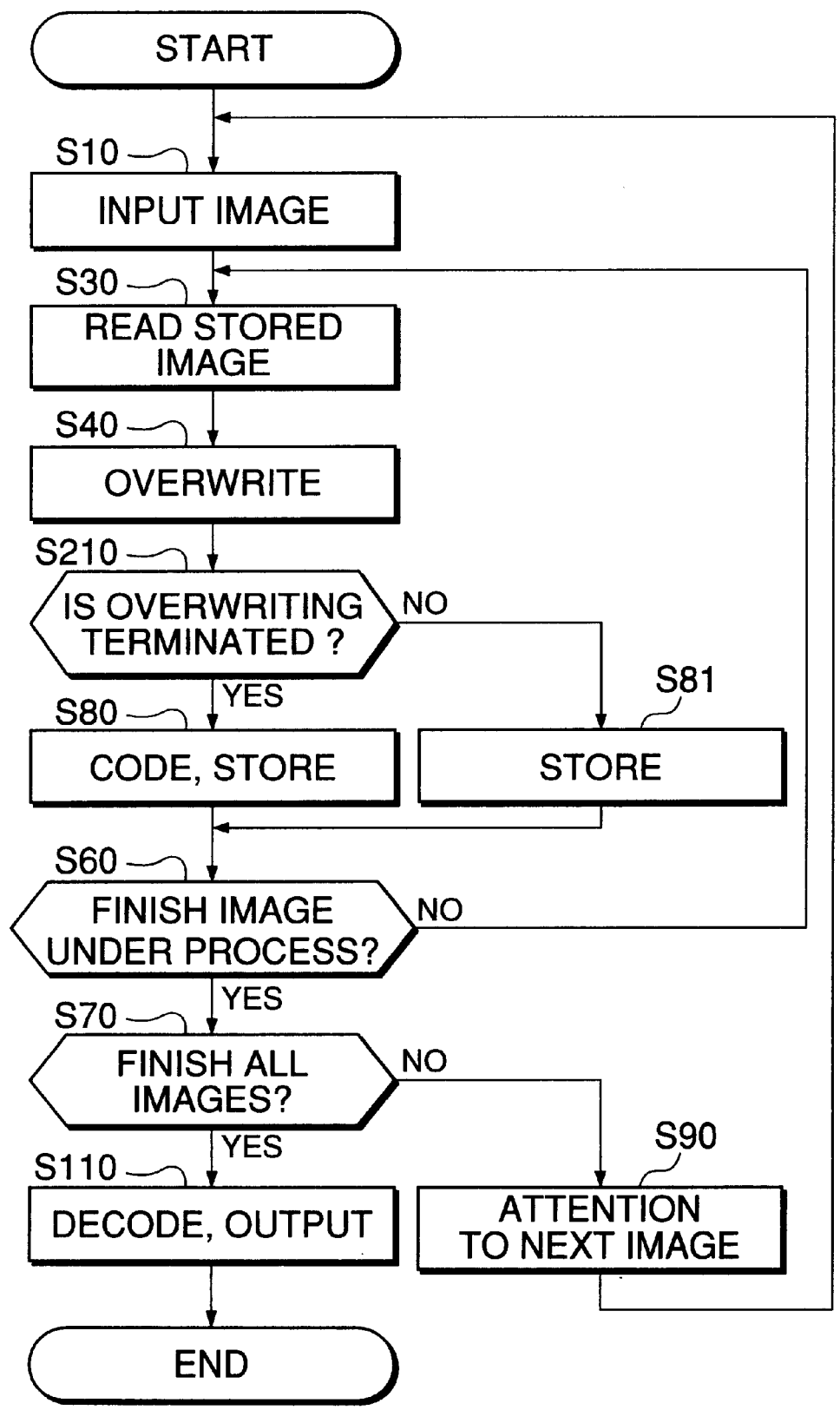
FIG. 2 is a flowchart illustrating an example of the operation of the overwriting in the first embodiment of the image processing device of the invention.
Figure 3A:
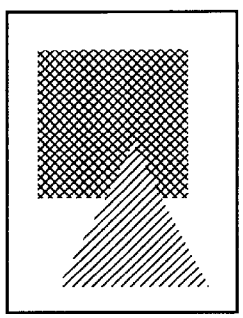
FIGS. 3A–3F are diagrams explaining the processing prediction in the first embodiment of the image processing device of the invention.
Figure 3B:
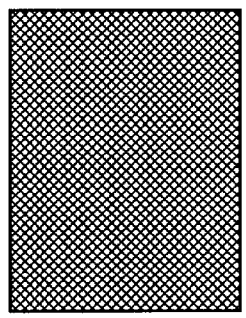
Figure 3C:
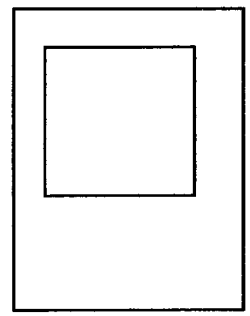
Figure 3D:
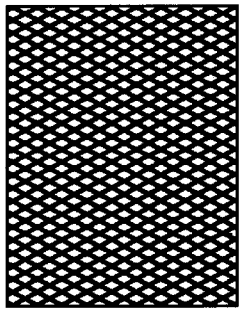
Figure 3E:
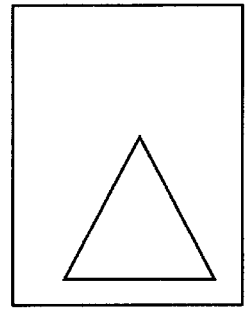
Figure 3F:
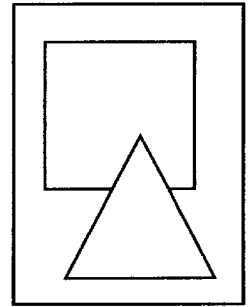
Figure 15:
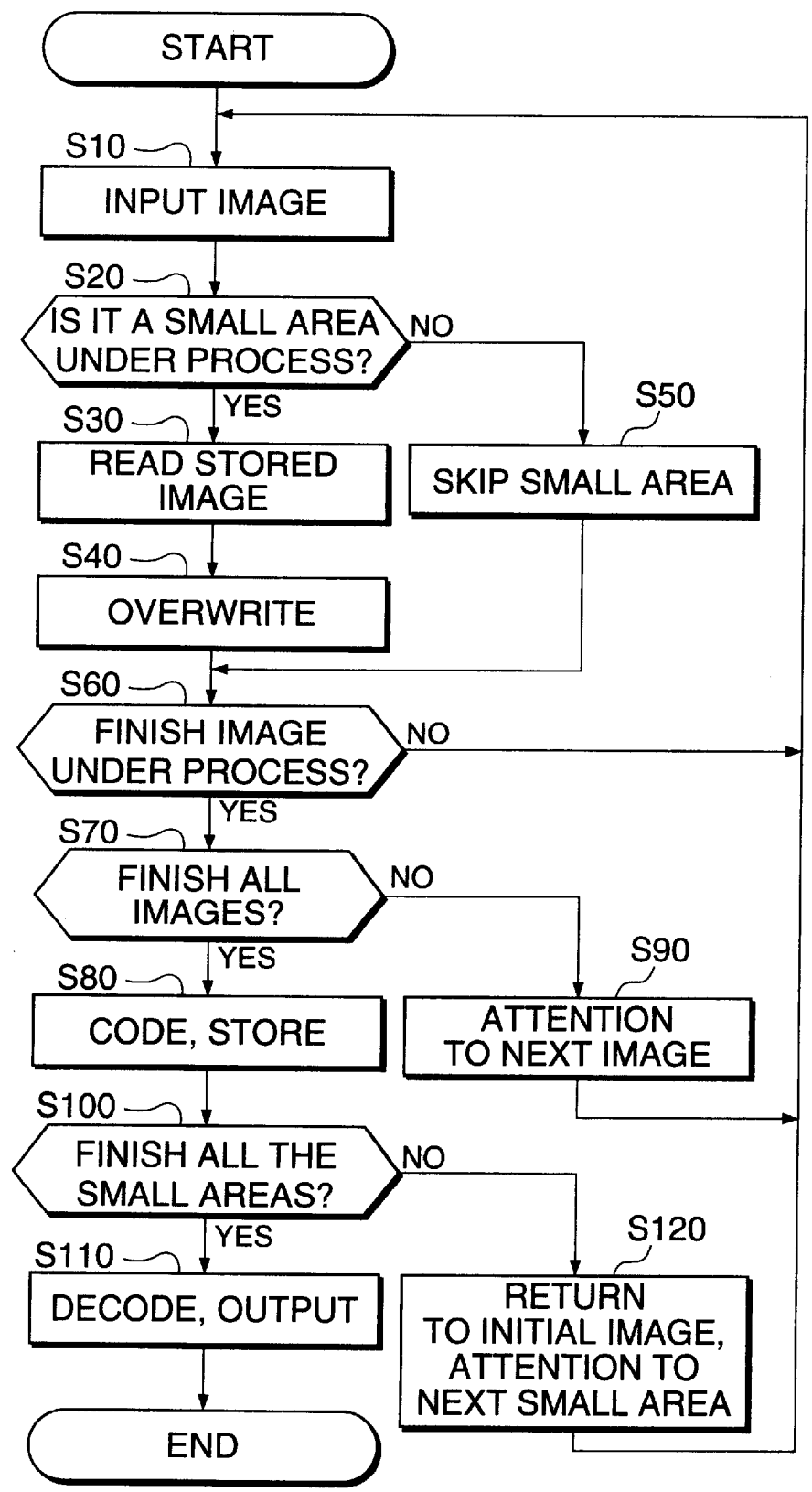
FIG. 15 is a flowchart illustrating an example of the operation of the image processing device of the first conventional example.
Figure 17:
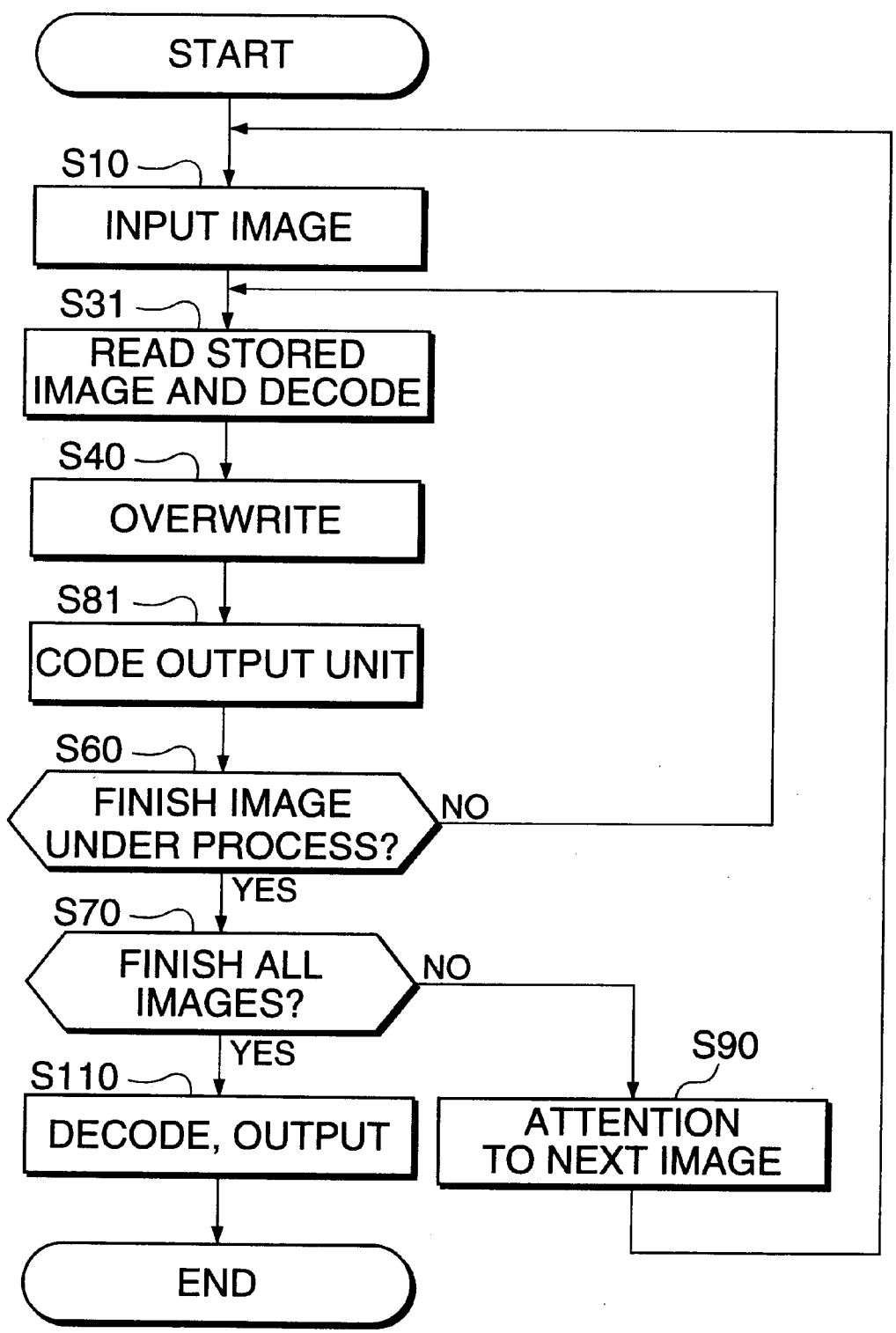
FIG. 17 is a flowchart illustrating an example of the operation of the image processing device of the second conventional example.

Based on the foregoing configuration, the operation of the first embodiment will be discussed. FIG. 2 illustrates a flowchart of the operation of the first embodiment. In the drawing, the same parts as those in FIG. 15 and FIG. 17 are given the same symbols, and the explanation with be omitted.

In FIG. 2, at S210, if the overwriting of the processed image data 130 is completed, the step advances to S80; and if not, the step goes to S81. At S81, the processed image data 131 are not encoded, and stored in the compact page memory 60 as they are.

Of these operations, the processing prediction in the processing prediction unit 90 will be explained. The processing prediction operation predicts whether or not there remains processing to be done in the small areas. Accordingly, it examines that a small area relates to which input image, but since this does not require the pixel value information, this can be done by processing lighter than the general PDL decomposition. Specially, such processing as pasting a raster object can be done with a comparably high speed.

FIG. 3 explains the concept of the processing prediction. Suppose that FIG. 3A is a desired image as finally obtained. Here, the PDL decomposer holds information as shown in FIG. 3B and FIG. 3E. That is, FIG. 3B presents a pixel value information of the first sheet of the input image, and FIG. 3E presents an information showing the outline of an effective area of the first sheet of the input image. The outline information such as FIG. 3C will hereafter be called the shape information. In the same manner, FIG. 3D, FIG. 3E each illustrates the pixel value information and the shape information of the second sheet of the input image. Now, assuming that FIG. 3A is generated by the PDL decomposer, generally, FIG. 3C and FIG. 3E are combined into an overlapped shape information as FIG. 3F, and thereafter, FIG. 3B and FIG. 3D are referred to, and the final image FIG. 3A is generated. What the invention wishes to obtain is the result of the above processing prediction. Therefore, only the shape information as FIG. 3F is sufficient, and the processing on the latter half can be omitted. In case of the aforementioned processing as pasting a raster object, and the like, since the processing load on the above latter half is extremely heavy, the effect of this embodiment becomes significant.

The processing prediction will be described in detail. Here, processing on the edge list being a format of the PDL processing data is adopted as an example. The edge list signifies a form that handles the identifier of an object and the number of objects continuing in the raster scan direction as unit information, and expresses the whole image by the enumeration of the unit information. The processing prediction of a specific small area can be made by the judgment whether or not there is an edge between the objects in that small area.

The state of this processing will be explained referring to FIG. 4. FIG. 4B illustrates one of the shape information shown in FIG. 4A, to which attention is paid on a specific line. FIG. 4C expresses an edge list of FIG. 4B. Here, the width of the small area is assumed to be 8 pixels. With regard to the three small areas included in FIG. 4B, judging only from the presence of edges between the objects in FIG. 4C, it is found that the overwriting is to be executed only in the central small area. Although the right and left small areas include edges, these are not the edges between the objects, and they are ignored. The above processing is for the uppermost line of the small areas, and the similar processing is needed to be executed to each line of the small areas.

The processing prediction on the edge list has been explained, but some other techniques can be conceived. For example, when a small area is defined as a block of n pixels x-n pixels, by plotting the block with the resolution lowered to 1/n, it is possible to confirm whether the overwriting with units of the small areas is to be executed. In this case, there is a possibility to misjudge by chance an overwriting with an area of the same size as a small area to be the overwriting of the small area. However, this hardly gives an influence on the whole, with the misjudgment not corrected. If the processing accuracy of the part is only modified, the misjudgment will be avoided. And, the decomposition processing generally adopts before the edge list a form of the two-dimensional information called the display list, and therefrom the same processing prediction as the edge list may be carried out. If such a configuration is taken on, the processing prediction will be performed with a fewer processing number than the edge list being the one-dimensional information.

The above description has been focused on the processing prediction that avoids the misjudgments, however it is conceivable as an option to reduce the processing load in return for permitting the misjudgments. The foregoing example that lowered the resolution is included in this example. The followings can be considered as the other examples: the processing prediction is locally executed only to the areas that might have the overwriting, or complicated shape information is approximated by simplified graphics to carry out the processing prediction.

Of the misjudgments created in these cases, as to misjudging a small area which has not been overwritten to have been overwritten, the processed data 131 are to be left in the compact page memory 60 after finishing the processing. Therefore, it is necessary to add a step that encodes such data after finishing the processing. On the contrary, as to misjudging a small area which has been overwritten to have not been overwritten, a small area to be overwritten is to be stored in the compact page memory 60 as the coded data 160. To prevent this misjudgment, it is preferable to control the prediction by means of the quantization, or the like. This represents such a control that detects, of the small areas judged to have not been overwritten, the ones having possibly been misjudged by the approximation error, and again judges those to have been overwritten. If such a control is impossible, the processing will become necessary which locally decodes as the second conventional example. However, since this decoding processing does not occur very often, there are not many problems of both the processing time and the image quality, as compared to the second conventional example.

Figures 5A, 5B:
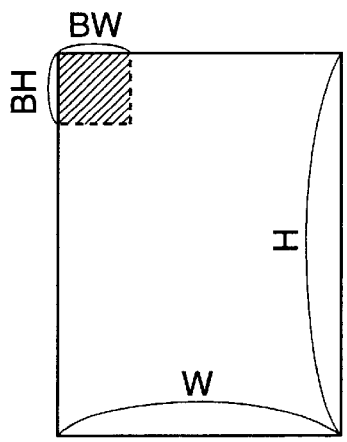
FIGS. 5A and 5B illustrate a data format example of a result by the processing prediction in the first embodiment of the image processing device of the invention.

Now, if the processing prediction thus explained is executed in advance or in parallel to the overwriting of the image before one page, and what input image turns out the final overlay image is memorized to each small area, it will be possible to control the operation of the termination judgment unit 91 in real time. FIG. 5 illustrates an example of the data format for the result of the processing prediction.

The small area here signifies a partial image to the whole image, and the breadth of the small area need not always be coincident with the breadth of the image. The optimum size of the small area varies depending on the buffer size of the device or the unit of processing. When considering only the processing of individual small areas that the invention aims at, to subdivide an image into smaller areas creates more small areas that can be compressed after the processing, which magnifies the effect of the present invention.

Figure 6A:
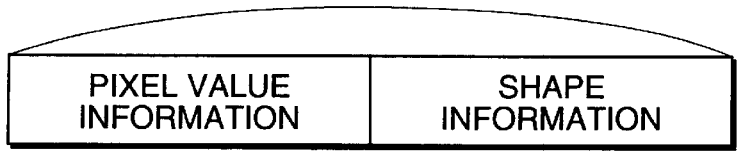
FIGS. 6A–6D illustrate a data format example of the input image data 110 in the first embodiment of the image processing device of the invention.
Figure 6B:
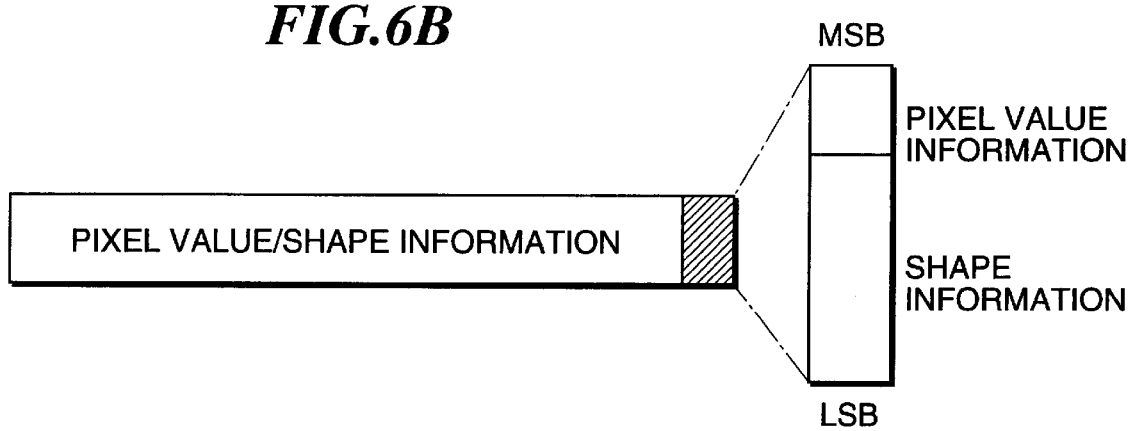
Figure 6C:
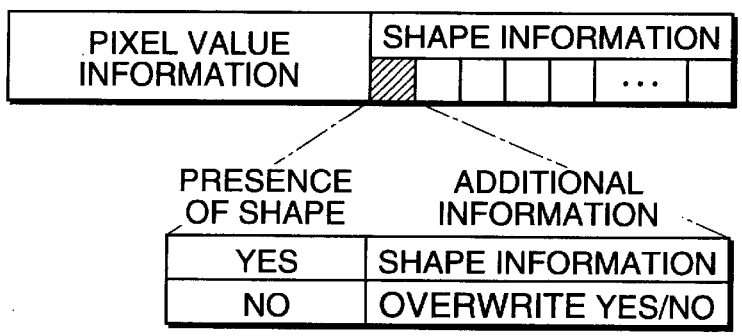
Figure 6D:
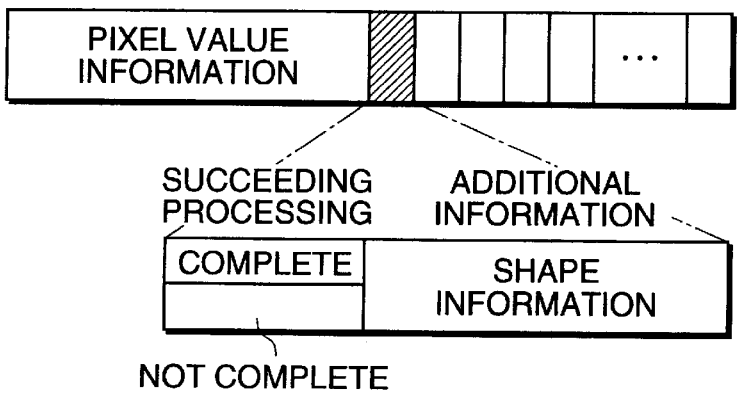

The input image data 110 configures a pair with pixel value information and shape information in order to implement the overlay in arbitrary shapes. FIG. 6 illustrates data format examples of the input image data 110. FIG. 6A is an example of the most general format, in which the pixel value information and the shape information form one data stream. Naturally, the order of the pixel value information and the shape information may be reversed. FIG. 6B is an example in which the pixel value information and the shape information are paired in pixel units. In this case, the shape information indicates to or not to execute overwriting. FIG. 6C is an example in which the shape information is divided into unit small areas, and when all the pixels in the unit small area are to be overwritten or all the pixels are not to be overwritten, the shape information of the small area is collected into one by counting the presence of shape as "no". This arrangement will make redundant shape information unnecessary. Naturally, the order of data may be formed such that the pixel value information and the shape information are paired by the unit small area. FIG. 6D illustrates a format in which the image input unit is able to know as to each small area whether or not there is the overwriting after the image now being processed. The format assumes almost the same configuration as that in FIG. 6A, except that the shape information includes the above information. In such a case, since the processing prediction data 191 in FIG. 1 can be generated directly from the input image data 110, the processing prediction unit 90 can simply be configured.

The encoding technique employed in this embodiment may be either reversible or irreversible. However, according to this embodiment, since all the small areas of the image are encoded only once, the application of the irreversible encoding technique will not produce any generation noise. As a typical example of the irreversible encoding technique can be cited the base line technique of the JPEG (Joint Photographic Coding Experts Group "JPEG algorithm—the international standard coding system for the color static image" (Endo, Interface, December 1991) etc.), which is also the international standard for the multivalued image compression coding.

In this embodiment, each of the small areas is encoded as an independent image. Since the general image encoding technique including the foregoing JPEG algorithm treats the image as a continuous information, once the image becomes coded, the separation will become difficult. On the other hand, in this embodiment, since each of the small areas is given a different treatment depending on whether the processing is completed or not, it is preferable to encode the small areas as the different images from the beginning.

In order to ascertain the effect of this embodiment, the processing time will be compared on calculation. First, in regard to the variables, S is meant as representing the number of small area images when decomposing one image into the small area images, and A as representing the total number of the small area images included in all the input image. Since the overwriting is executed to the inputted A pieces of the small area images to output S pieces of the small area images, always the relation S≦A is satisfied. Further, the processing times of the overwriting and the encoding/decoding processing are each denoted by To and Tc. Since the load in the overwriting is light and the parallel processing thereof can easily be made, generally the relation To<Tc is met.

In the first conventional example, the image overwriting time is S×A×To, and the encoding time is S×Tc, and assuming that both the processes are operated in parallel, the total processing time amounts to max (S×A×To, S×Tc). Next, in the second conventional example, since the decoding can be a bottle neck, the overwriting time becomes max (A×To, A×Tc) The encoding time is not needed to be considered. In contrast to these, since the overwriting and the encoding processing are executed in parallel in this invention and the one taking more time becomes a bottle neck, the total processing time amounts to max (A×To, S×Tc).

Figure 7:
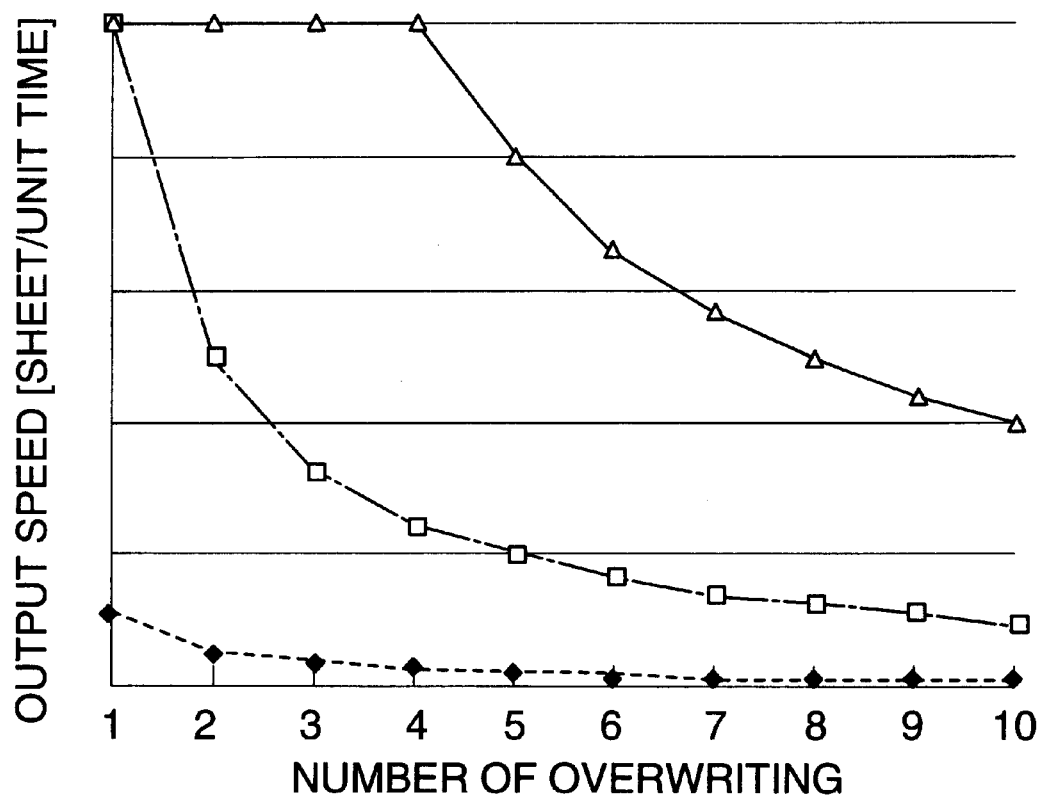
FIG. 7 is a graph illustrating the effect of the first embodiment of the image processing device of the invention.

FIG. 7 is a diagram to compare the processing times of each configurations, adopting the axis of abscissas as the number of input images for overwriting. However, assuming that the image of 35 million pixels is divided into small area images of 1 Mbytes, S=35; and, assuming that the overwriting can deal with four pixels at one time, 4To=Tc are premised. The axis of ordinates represents the processed number of sheets per unit time, and a larger one shows a higher processing. This chart clearly shows the effect of this invention.

According to this embodiment, since the feedback loop to the overwriting does not include the encoding processing and the decoding processing which are not originally necessary, the processing time can be shortened. On the other hand, since the image having completed the overwriting is encoded to be stored in the compact page memory, the necessary memory quantity can be reduced. Further, even in case of applying the irreversible coding technique that displays a high compression efficiency, the encoding is executed only once, and deterioration to the image quality is limited.

Second Embodiment

As the second embodiment of the invention, the image processing device not including the decoding processing will be described. The image compression coding can be employed for the long-term storage as a database and the communications, except for the applications for the temporal storage employed in the first embodiment. Presuming such a post-processing, the embodiment will be described which serves the compressed codes as they are as the output.

First, the basic concept of the second embodiment will be explained. As mentioned in the first embodiment, the resultant data are stored in the compact page memory 60 in FIG. 1, in which small areas are each encoded as the independent images. This will suffice for the temporal storage as the first embodiment, however in the second embodiment aiming at the foregoing applications, the quantity of the codes becomes an important element. In order to reduce the quantity of the codes, it is generally preferable to deal with the image as a continuous element as far as possible. In case of the foregoing JPEG, the differential of the DC component between the blocks is encoded, and the very processing represents this example. From the view point of handling of the coded data, it is preferable that plural codes by each small areas are collected into one.

Figure 8:
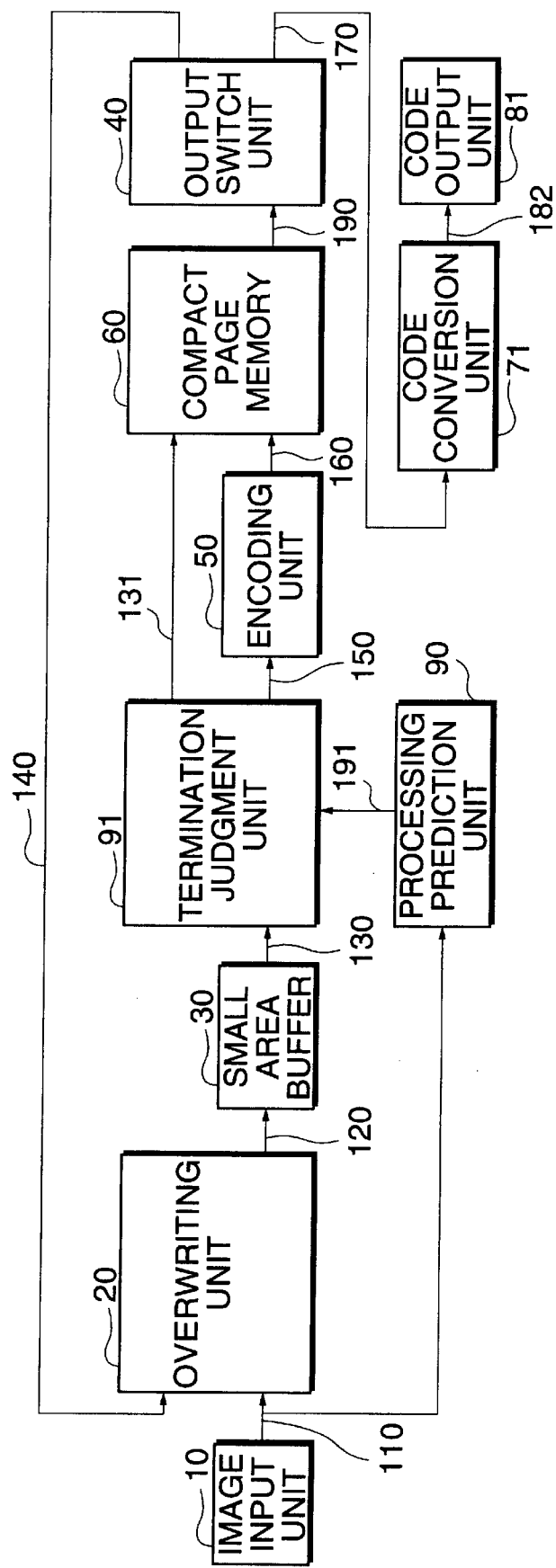
FIG. 8 is a block diagram illustrating the second embodiment of the image processing device of the invention.

Accordingly, the second embodiment converts stored codes into a continuous codes, and thereafter outputs them. The second embodiment will be described concretely. FIG. 8 illustrates a block diagram of the second embodiment of the invention. In the drawing, the same parts as in FIG. 1 are given the same symbols, and the explanation will be omitted. 71 denotes a code conversion unit, 81 a code output unit, and 182 output coded data.

Each unit shown in FIG. 8 will be described. The code conversion unit 71 applies a specific code conversion to the coded data 170 to send out the result as the output coded data 182 to the code output unit 81. The code output unit 81 outputs the output coded data 182 to the external device.

The operation can easily be understood from the first embodiment, and the explanation will be omitted.

Figure 9A:
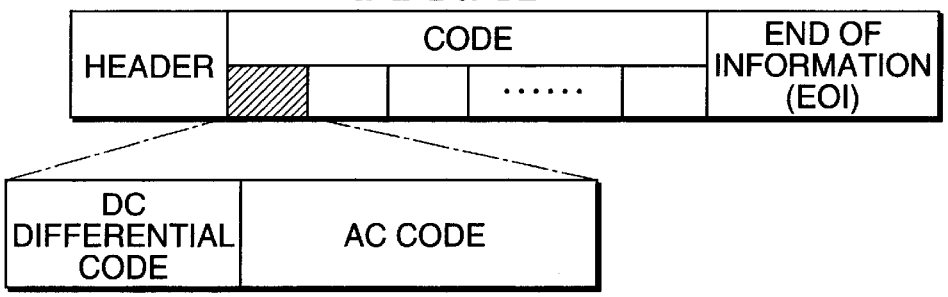
FIGS. 9A–9D are diagrams explaining the code conversion processing in the second embodiment of the image processing device of the invention.
Figure 9B:
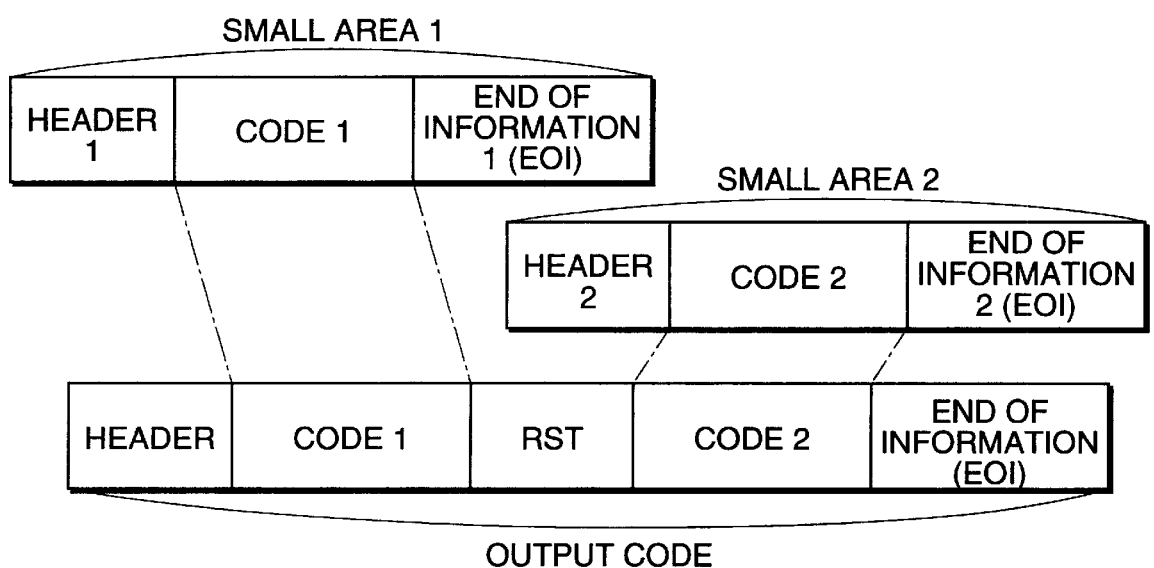
Figure 9C:
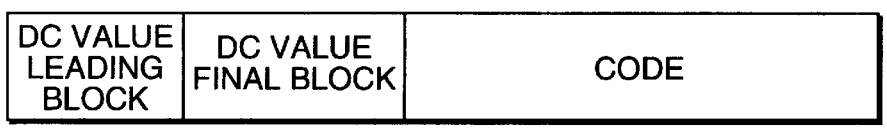

Here, the code conversion processing in the code conversion unit 71 will be described. FIG. 9 is a diagram to explain the code conversion of this embodiment. FIG. 9A illustrates a simplified basic code format of the JPEG. The JPEG code is configured with the code by dc component differentials and the code by ac components, and the header and the termination information (EOI, End Of Image) are laid out before and after the code. If the coded data 170 takes on the format in FIG. 9A by each small area, the output coded data 182 can be configured as shown in FIG. 9B, as an example. In the drawing, RST (ReSTart) represents one of control signals called the JPEG marker, and functions to initialize the bit position of a code and the differential value of dc components. Therefore, coupling the codes by each small areas with RST will decode the codes individually generated as a piece of image. The above is devised to the output coded data 182, however on the contrary the coded data 170 may be configured to be easily integrated. FIG. 9C shows an example of this. The format in FIG. 9C is characterized in that the dc component values of the leading block and the final block included in the succeeding codes are not encoded, but are used as the data as they are. If the coded data 170 assumes this format, the output coded data 182 with the format in FIG. 9A will easily be generated by calculating the differential values before and after.

Figure 9D:
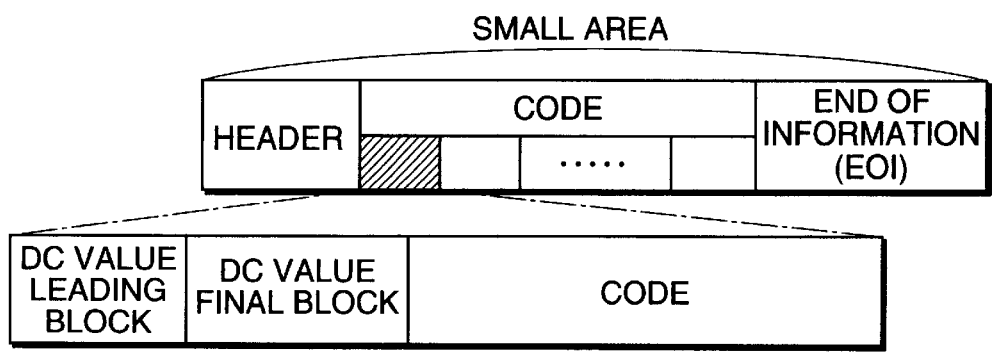

The above discussion represents a case that the small areas are configured in the same scan order as the whole image. The scan order will be explained referring to FIG. 10. The JPEG encoding is executed in the scan order shown in FIG. 10A. In relation to this, if the image is divided into small areas as a small area 1 in FIG. 10B, the small area and the whole image can be processed in the same scan order, and the above discussion is applicable as it is. However, if the image is divided into small areas as a small area 2 in FIG. 10B, the scan order is made different, and the coded data 170 cannot be integrated as they are. FIG. 9D shows a code format in such a case. The format is configured such that the codes are independent by a unit of each block line, and each of the codes follows FIG. 9C. Here, the block line signifies a horizontal area such that the vertical length is the block size and the horizontal is the image size. The conversion of the scan order can easily be processed by making each block line independent. In this case, the header may include the configuration information relating to the position of the leading code in each block line and the code length, etc. FIG. 10C illustrates an example of such side data.

Figure 11:
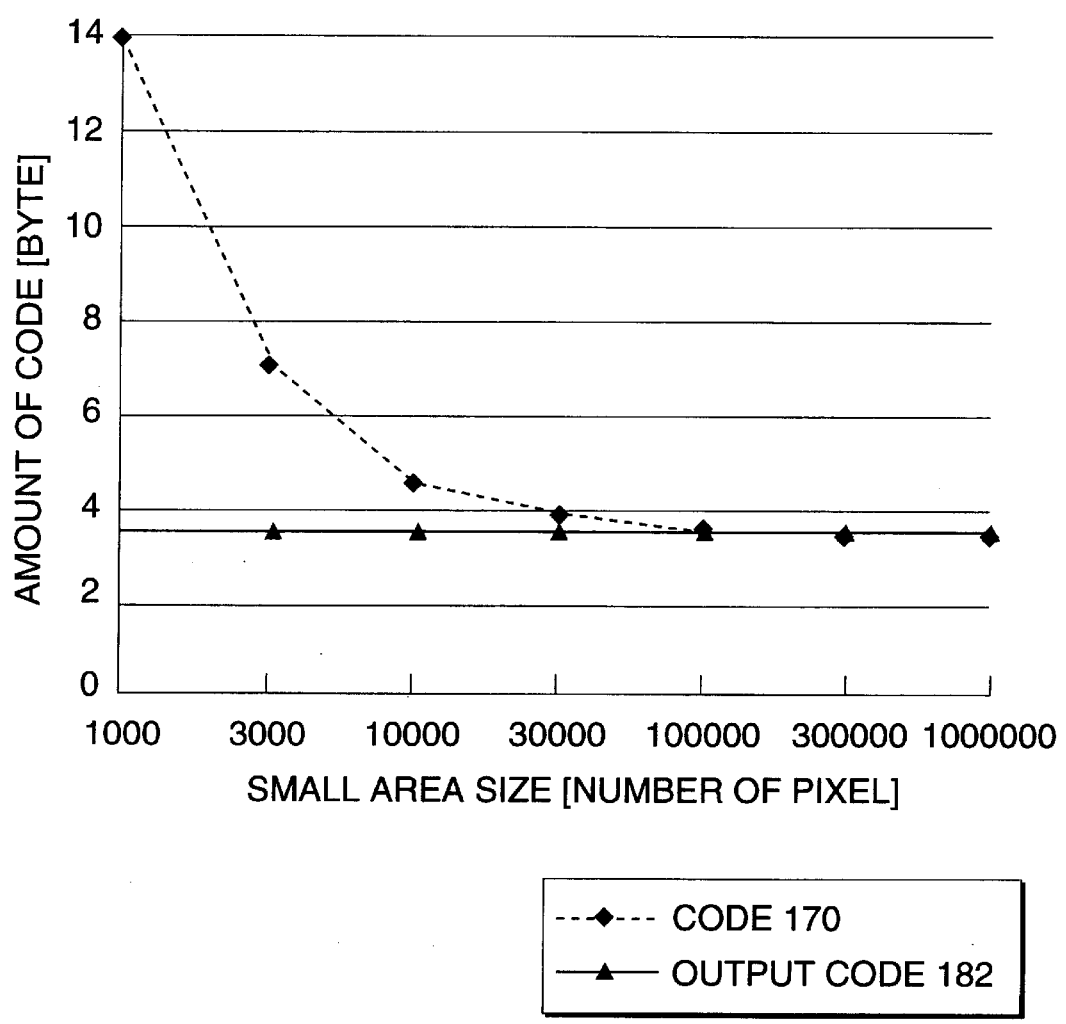
FIG. 11 is a graph illustrating the effect of the second embodiment of the image processing device of the invention.

To explain the effect of the second embodiment, the coded data 170 and the output coded data 182 are compared as to the quantity of code. FIG. 9A is presumed as the coded data 170, and in contrast to the case in which the whole image is collectively coded, the overhead of 300 bytes by each of the small areas is assumed to be included. The compression factor when the whole image is collectively coded is assumed 20, and the image size is assumed 35 million pixels. FIG. 11 illustrates, under this assumption, a comparison of the quantity of code between the coded data 170 and the output coded data 182, serving the axis of abscissas as the size of the small area. From this graph, the effect of this embodiment is clear, especially when the size of the small area is small.

While being described with the JPEG as an example, this embodiment can be applied in the same manner to the other image coding technique as well.

According to this embodiment, since the codes temporarily stored are converted into efficient codes and thereafter outputted, it is possible to acquire the codes of small code quantity that effect a higher compression efficiency.

Third Embodiment

As the third embodiment of the invention, the image processing device not including the processing prediction will be described. As described in the first embodiment, the processing prediction of this invention does not lead to a heavy load, however there are some cases that preferably simplify the configuration further more owing to circumstances of the mounting or the like. This embodiment intends to answer such a case.

First, the basic concept of the third embodiment will be explained. Since the processing prediction is omitted, there is a possibility that the overwriting is created in the encoded image. To start the decoding in this state will lead to the problems of the processing speed and the image quality as the second conventional example. Therefore, a part that stores raw images is provided so as to make the decoding processing unnecessary. This arrangement requires a page memory to increase the cost.

Figure 12:
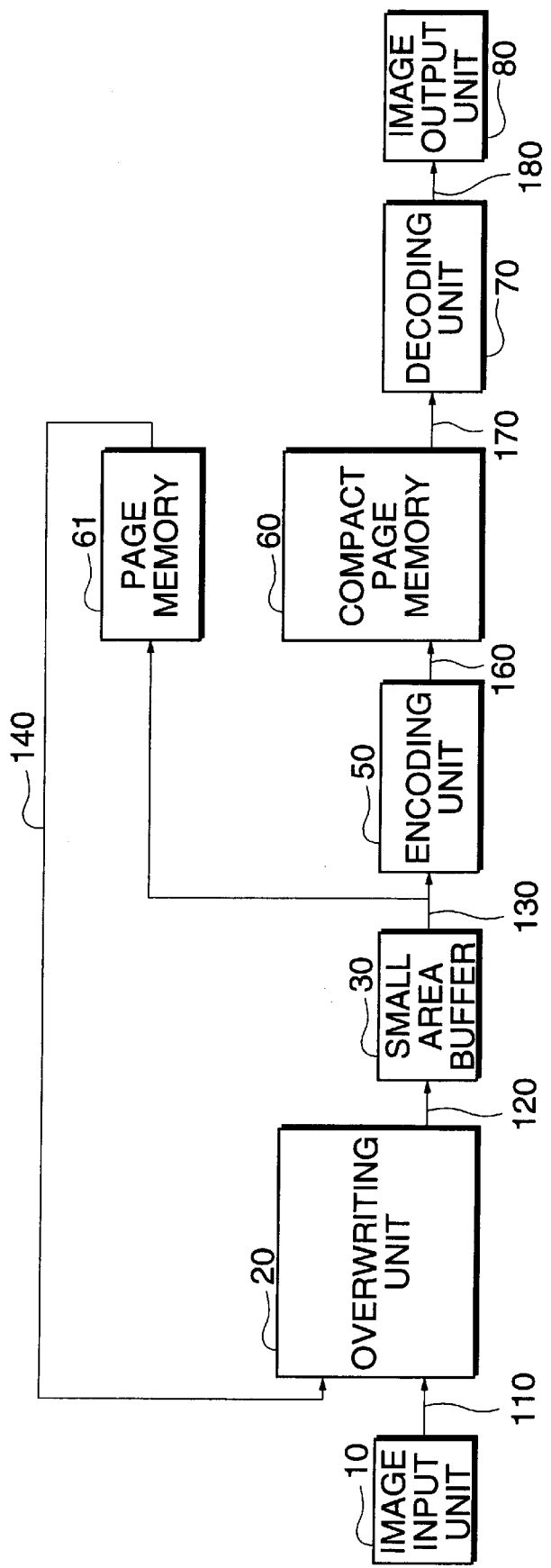
FIG. 12 is a block diagram illustrating the third embodiment of the image processing device of the invention.
Figure 13A:
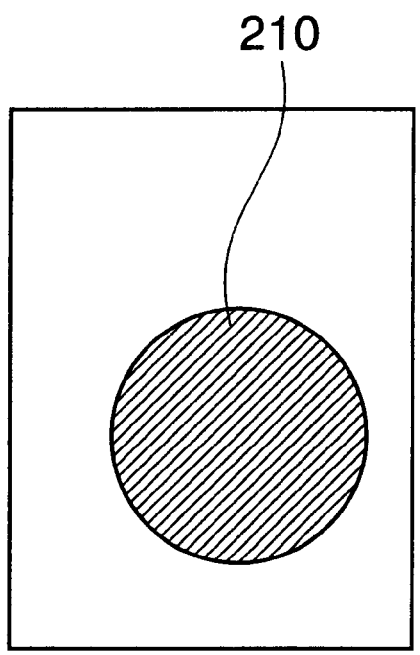
FIGS. 13A and 13B are diagrams explaining the concept of the overwriting.
Figure 13B:
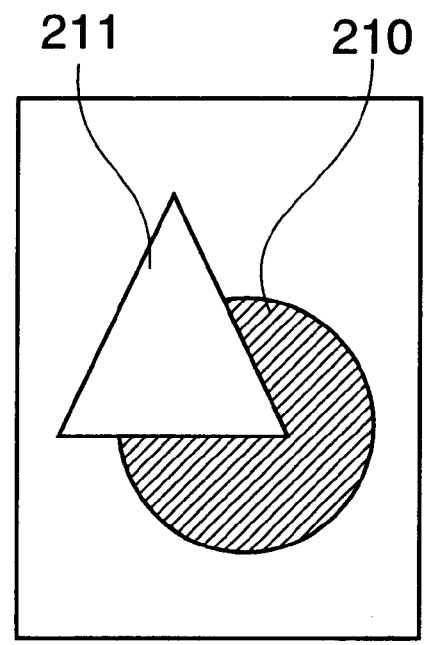

The third embodiment will be described concretely. FIG. 12 illustrates a block diagram of the third embodiment of the invention. In the drawing, the same parts as in FIG. 1 and FIG. 8 are given the same symbols, and the explanation will be omitted. 61 denotes a page memory.

The page memory 61 stores the processed image data 130 transmitted from the small area buffer 30, and sends them out to the overwriting unit 20 as the stored image data 140.

The operation can easily be understood from the first and second embodiments, and the explanation will be omitted.

The processed image data 130 are stored double in the page memory 61 and the compact page memory 60 as to all the small areas. If the overwriting is created in the images inputted thereafter, the corresponding small area will be read from the page memory 61. The data stored in the compact page memory 60 are outputted at the time all the processes are completed. Therefore, any of the small areas experiences the encoding processing only once.

Since this embodiment includes the page memory 61, there is a cost increase compared to the first or the second conventional example. However, there are not any differences in the processing speed and the image quality against the first embodiment, this embodiment exhibits the same effect in those respects as the first or the second embodiment.

And, when a case in which the compact page memory is omitted from this embodiment is compared with, for example, the configuration of the second embodiment that leaves out the encoding unit 50 and the decoding unit 70, since the cost of the compact page memory of this embodiment can be ignored, this case is comparable in the cost to the second embodiment. However in this embodiment, while the compact page memory 60 is outputting, the input of a next page can be executed. On the other hand, the foregoing case has to contain the page memory with double buffers, which doubles the processing time and the cost.

In this embodiment, since the image is made to be stored double in the compression and the non-compression, a simplified configuration with the processing prediction omitted can be achieved.

As clearly understood from the above description, the overwriting device can be implemented in a low cost at high speed. Further, the application of the irreversible coding technique will achieve the image processing of high image quality, and supply the code with a high compression efficiency. Further, the configuration with the processing prediction omitted is possible.

What is claimed is:

1. An image processing device for overwriting a stored image with a newly inputted image data, comprising:
   an image input part that inputs a partial image;
   a data storage part that stores plural partial images containing an encoded partial image and an overwritten partial image;
   an overwriting part that executes the overwriting of the partial image read from the data storage part with the partial image inputted from the image input part and outputs the overwritten partial image;
   an encoding part that executes an image compression coding of the overwritten partial image and outputs the encoded partial image;
   a processing prediction part that executes a processing prediction for the overwritten partial image from the overwriting part;
   a determination part that determines which partial image, of the overwritten partial image and the encoded partial image, to write in the data storage part, on the basis of the processing prediction by the processing prediction part; and
   a decoding part that performs decoding processing being a reverse processing of the coding processing executed by the encoding part and outputs a decoded partial image,
   wherein the processing prediction part executes a prediction as to whether or not the overwriting is to be executed thereafter, and the data storage part stores the partial image determined by the determination part.

2. An image processing device for overwriting a stored image with a newly inputted image data, comprising:
   an image input part that inputs a partial image;
   a data storage part that stores plural partial images containing an encoded partial image and an overwritten partial image;
   an overwriting part that executes the overwriting of the partial image read from the data storage part with the partial image inputted from the image input part and outputs the overwritten partial image;
   an encoding part that executes an image compression coding of the overwritten partial image outputted from the data storage part;
   a processing prediction part that executes a processing prediction for the overwritten partial image from the overwriting part;
   a determination part that determines which partial image, of the overwritten partial image and the encoded partial image, to write in the data storage part, on the basis of the processing prediction by the processing prediction part; and
   a code conversion part that executes a code conversion of a code data outputted from the data storage part to reduce a code amount thereof and outputs a converted code data,
   wherein the processing prediction part executes a prediction as to whether or not the overwriting is to be executed thereafter, and the data storage part stores the partial image determined by the determination part.

3. An image processing device for overwriting a stored image with a newly inputted image data, comprising:
   an image input part that inputs a partial image;
   a first data storage part that stores plural partial images containing an overwritten partial image;
   an overwriting part that executes the overwriting of the partial image read from the first data storage part with the partial image inputted from the image input part and outputs the overwritten partial image;

an encoding part that executes an image compression coding of the overwritten partial image and outputs an encoded partial image;

a second data storage part that stores the encoded partial image outputted from the encoding part; and a decoding part that performs decoding processing being a reverse processing of the coding processing executed by the encoding part and outputs a decoded partial image, wherein the partial image is stored in the first data storage part and the second data storage part, respectively, in a form of non encoded image data and code data.

4. An image processing device for overwriting a stored image with a newly inputted image data, comprising:

an image input part that inputs a partial image;

a first data storage part that stores plural partial images containing an overwritten partial image;

an overwriting part that executes the overwriting of the partial image read from the first data storage part with the partial image inputted from the image input part and outputs the overwritten partial image;

an encoding part that executes an image compression coding of the overwritten partial image and outputs an encoded partial image;

a second data storage part that stores a code outputted from the encoding part; and a code conversion part that executes a code conversion of a code outputted from the second data storage part to reduce a code amount thereof and outputs a converted code, wherein the partial image is stored in the first data storage part and the second data storage part, respectively, in a form of non encoded image data and encoded data.

5. The image processing device as claimed in claim 1, wherein the partial image is encoded and decoded as an independent image in the encoding part and the decoding part, respectively.

6. The image processing device as claimed in claim 2, wherein the encoding part encodes the partial image independently, and part of the partial image is stored in the data strage part without being encoded to be integrated easily by the code conversion part.

7. The image processing device as claimed in claim 6, wherein the part of the partial image is a dc component of the leading and the final blocks of the partial image.

8. The image processing device as claimed in claim 2, wherein the partial image is encoded independently in the encoding part, and plural independent codes thus obtained are configured in the order that enables easily integrating thereof in the code conversion part.

9. The image processing device as claimed in claim 8, wherein the plural independent codes are independent in a unit of a block line.

10. The image processing device as claimed in claim 8, wherein a start position and a code length of each of the plural independent codes are included in the code of the partial image as side information.

11. The image processing device as claimed in claim 2, wherein the code conversion processing executed by the code conversion part reduces the code amount by integrating the codes of each partial image as a code of a single image.

12. The image processing device as claimed in claim 11, wherein integrating the codes as a code of a single image is executed by calculating a differential of dc components between adjoining codes of each partial image.

13. The image processing device as claimed in claim 11, wherein integrating the codes as a code of a single image is executed by adding a control signal to initialize the encoded and decoded codes between the codes of each partial image.

14. The image processing device as claimed in claim 13, wherein the control signal is a restart marker.

15. The image processing device as claimed in claim 1, wherein the encoding and decoding processing executed by the encoding part and the decoding part is irreversible processing according to JPEG.

16. The image processing device as claimed in claim 1, wherein the processing prediction executed by the processing prediction part is executed by simplified image generation processing.

17. The image processing device as claimed in claim 1, wherein the processing prediction is executed before the overwriting is started.

18. The image processing device as claimed in claim 1, wherein the processing prediction is executed in parallel with the overwriting of an image on which the prediction processing has been completed.

19. The image processing device as claimed in claim 1, wherein the partial image is rectangular.

20. The image processing device as claimed in claim 19, wherein the number of each of horizontal and vertical pixels of the partial image is a multiple of 8.

21. An image processing method, comprising the steps of:

inputting an input image;

executing overwriting of a partial image from a stored image with a partial image from the input image and outputting an overwritten partial image;

executing a processing prediction to determine whether or not overwriting of the overwritten partial image is completed;

if overwriting of the overwritten partial image is completed, executing an image compression coding to generate a code by a predetermined image compression technique;

storing the overwritten partial image or the code generated by the image compression coding; and executing decoding processing being reverse processing of the image compression coding on the code generated by the image compression coding.

22. An image processing method, comprising the steps of:

inputting an input image;

executing overwriting of a partial image from a stored image with a partial image from the input image and outputting an overwritten partial image;

executing a processing prediction to determine whether or not overwriting of the overwritten partial image is completed;

if overwriting of the overwritten partial image is completed, executing an image compression coding to generate a code by a predetermined image compression technique;

storing the overwritten partial image or the code generated by the image compression coding; and executing code conversion processing on the code generated by the image compression coding, whereby reducing a code amount thereof.

* * * * *